United States Patent [19]
Tomisaki et al.

[11] Patent Number: 5,444,371
[45] Date of Patent: Aug. 22, 1995

[54] MAGNETIC DISK OFFSET AMOUNT MEASURING APPARATUS

[75] Inventors: Itaru Tomisaki, Kanagawa; Toru Takeda, Saitama, both of Japan

[73] Assignee: Sony Corporation, Tokyo, Japan

[21] Appl. No.: 202,494

[22] Filed: Feb. 28, 1994

[30] Foreign Application Priority Data

Mar. 2, 1993 [JP] Japan .................. 5-066248

[51] Int. Cl.$^6$ ............... G11B 20/14; G01R 33/12
[52] U.S. Cl. ................. 324/212; 360/77.04
[58] Field of Search ............ 324/210, 212; 360/25, 360/31, 77.01, 77.02, 77.04, 77.06

[56] References Cited
FOREIGN PATENT DOCUMENTS

0233606A2 8/1987 European Pat. Off. .
0238318A2 9/1987 European Pat. Off. .
0516125A2 12/1992 European Pat. Off. .

OTHER PUBLICATIONS

Patent Abstracts of Japan, vol. 15, No. 162, Apr. 23, 1991 (Yosuke et al.).
Patent Abstracts of Japan, vol. 13, No. 520, Nov. 21, 1989 (Shigenobu et al.).
Patent Abstracts of Japan, vol. 15, No. 402, Oct. 14, 1991 (Masao).
Patent Abstracts of Japan, vol. 16, No. 571, Dec. 11, 1992 (Nobuyuki).

Primary Examiner—Gerard R. Strecker
Attorney, Agent, or Firm—Jay H. Maioli

[57] ABSTRACT

An offset amount measuring apparatus for measuring an offset amount resulting from an offset produced when a disk, which is provided with a plurality of clock mark signals recorded around each circular data track at physically regular intervals, is mounted by chucking on a disk apparatus, reading the clock mark signals from the circular data track with a head, is disclosed. The apparatus comprises time interval measurement means for measuring the time interval between clock mark reproduced signals output from the head while the head is positioned at a distance of a predetermined radius from the center of rotation of the disk, offset amount calculation means for obtaining the distance between a locus of the head traced on the disk when the same is rotated and the circular data track from the time interval between the clock mark reproduced signals measured by the time interval measurement means, and offset amount storage means for storing the distance obtained by the offset amount calculation means as the offset amount in relation to the angle of rotation of the disk. By the use of this apparatus, it is possible to measure the offset amount electronically without using a mechanical measuring instrument, and precisely without decreasing the disk capacity.

9 Claims, 17 Drawing Sheets

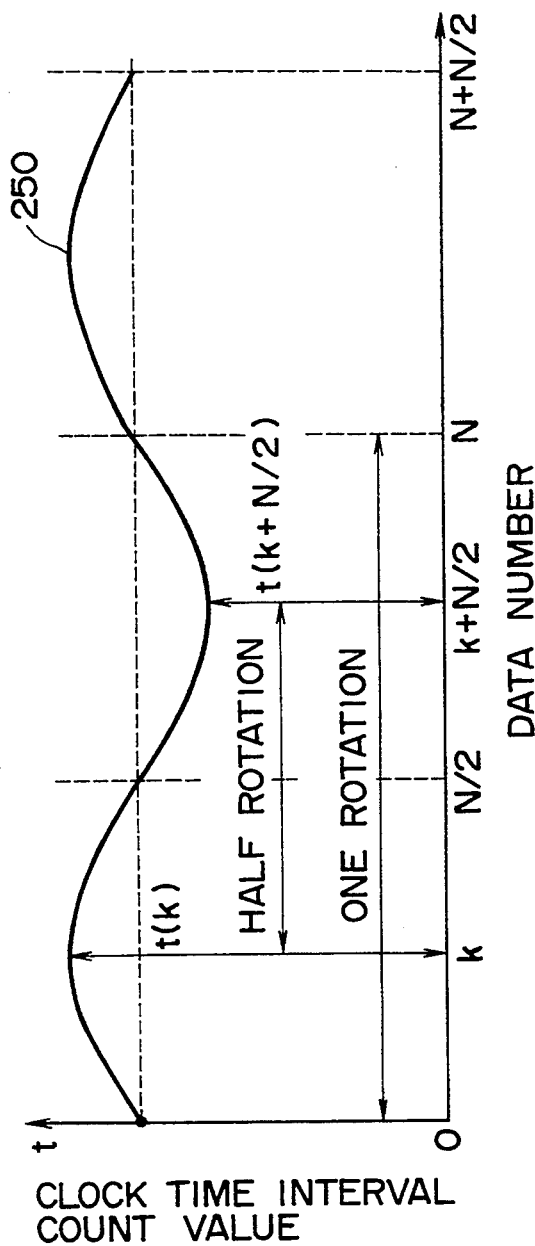
F I G. 6
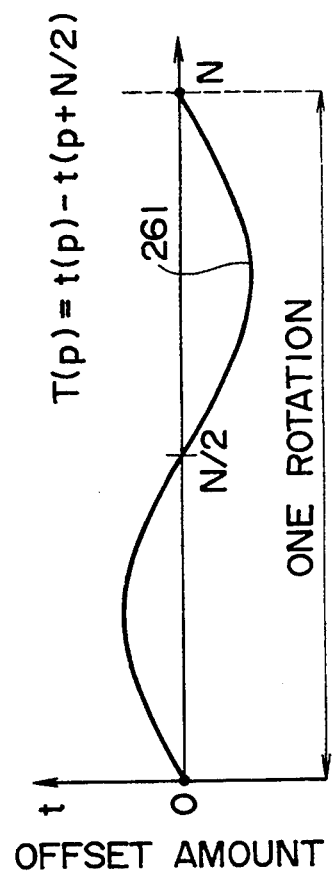
F I G. 7

5,444,371

MAGNETIC DISK OFFSET AMOUNT MEASURING APPARATUS

BACKGROUND OF THE INVENTION

The present invention relates to an offset amount measuring apparatus suitable for use in measuring an offset amount in reproduced signals resulting from an offset between the center of the circular data track of a disk and the center of rotation of the disk.

Conventionally the measurement of an offset amount produced at the time the disk having circular data track was chucked on the revolving shaft of the spindle motor has been carried out with the use of a precision rotating stage and a microscope.

Such an offset amount measuring method is difficult to be practiced in a small disk drive apparatus.

There is also disclosed a method to correct the offset of the disk produced when it is chucked, in Japanese Patent Laid-open No. Sho 63-61478 (laid open on 1988.03.17). This method utilizes a dedicated area provided on the disk to form therein a position signal pattern to measure an offset amount, the offset amount is measured from a reproduced signal of the pattern, and the offset amount measured is used for offset correction.

In such a case, however, it is required to provide a dedicated area on the disk for the measurement of the offset amount and the dedicated area has to have a sufficient margin in order that the position signal for the offset amount measurement is read unaffected by the offset.

Hence, there arises a problem that the data recording capacity of the disk is decreased accordingly.

Further, sometimes noise is produced superposed on the reproduced signal of the position signal pattern, and hence a problem arises that the accuracy of the detected offset amount is impaired.

SUMMARY OF THE INVENTION

The present invention was made in view of the above described situations. Accordingly, an object of the present invention is to provide an offset amount measuring apparatus capable of measuring the offset amount electrically without using a mechanical precision measuring instrument.

Another object of the present invention is to provide an offset amount measuring apparatus capable of measuring the offset amount with precision without decreasing the data storage capacity of the disk.

The offset amount measuring apparatus of the invention is an apparatus that measures an offset amount resulting from an offset produced when a disk is mounted on a disk apparatus by chucking, in which the disk (for example, a magnetic disk 1 in FIG. 3.) is provided with N (N is an integer larger than 1) clock mark signals recorded around each circular data track at physically regular intervals, and the disk apparatus reads the clock mark signals from the circular data track with a head (for example a record/reproduce head 3 in FIG. 3), and it comprises time interval measurement means (for example, a time interval measuring portion 70 in FIG. 3) for measuring the time interval between clock mark reproduced signals output from the head while the head is positioned at a distance of a predetermined radius from the center of rotation of the disk, offset amount calculation means (for example, an offset amount calculating portion 25E in FIG. 3) for obtaining the distance between a locus of the head traced on the disk when the same is rotated and the circular data track from the time interval between the clock mark reproduced signals measured by the time interval measurement means, and offset amount storage means (an offset amount storing portion 26E in FIG. 3) for storing the distance obtained by the offset amount calculation means as the offset amount in relation to the angle of rotation of the disk.

The time interval measuring apparatus measures data of the time interval between the clock mark reproduced signals at least for one rotation of the disk.

Further, the time interval measurement means measures the time interval between the clock mark reproduced signals when the locus of the head is closest to the center of the circular data track and when the locus of the head is farthest away from the center of the circular data track.

In the above described offset amount measuring apparatus, the time interval measurement means (for example, a flip-flop 71, counter 72, inverter 73, counter 74, oscillator 75, and a switch 76 in FIG. 4) performs measurement of the time interval between the (n+m)th clock mark reproduced signal (n is any integer of 1 to N) and the (n+m+1)th clock mark reproduced signal for each integer of m=0 to (N+N/2−1), the offset amount calculation means has time interval storage means (for example, a memory 252 in FIG. 4) for storing the measured time intervals, and subtraction means (for example, a subtracter 255 in FIG. 4) for performing subtraction of the (P+N/2)th time interval measured value from the pth time interval measured value stored in the time interval storage means for each integer of p=1 to N, and the offset amount storage means stores the results of subtraction performed by the subtraction means.

In the above described offset amount measuring apparatus, either the time interval measurement means or the offset amount calculation means includes moving average means (for example, a time interval measuring portion 70A in FIG. 8, a time interval measuring portion 70B in FIG. 12, or an adder 255C in FIG. 16) for averaging the time interval between clock mark reproduced signals, which correspond to the clock mark signals recorded on the disk adjoining one another, in a predetermined number of the time intervals within a half rotation of the disk and outputting pertinent average values, and the offset amount calculation means includes subtraction means (for example, a subtractor 255A in FIG. 8, a subtractor 259B in FIG. 12, or a subtractor 259C in FIG. 16) for obtaining the difference between the average values in different angular ranges of the disk output from the moving average means.

In the above described-offset amount measuring apparatus, the time interval measurement means (for example, the time interval measuring portion 70A in FIG. 8) performs measurement of the time interval between the clock mark reproduced signal at a predetermined angular position of the disk and the mth clock mark reproduced signal for each integer of M=1 to (N+N/2), the offset amount calculation means has time interval storage means (for example, a memory 252A in FIG. 8) for storing the measured time intervals, first subtraction means (for example, the subtractor 255A in FIG. 8) for performing subtraction of the (P+N/2)th time interval measured value from the pth time interval measured value stored in the time interval storage means for each integer of p=1 to N, subtraction result storage means (for example, a memory 256A in FIG. 8) for storing the results of the subtraction in the first subtraction means, average means (for example, an adder 257A and a divider 258A in FIG. 8) for obtaining the average value of the N results of subtraction stored in the subtraction result storage means, and second subtraction means (for example, a subtractor 259A in FIG. 8) for performing subtraction of the average value obtained by the average means from the kth subtraction result stored in the subtraction result storage means for each integer of k=1 to N, and the offset amount storage means stores the results of subtraction performed by the second subtraction means.

In the above described offset amount measuring apparatus, the time interval measurement means (for example, the time interval measuring portion 70B in FIG. 12) performs measurement of the time interval between the (n+m)th clock mark reproduced signal (n is any integer of 1 to N) and the (n+m+N/2)th clock mark reproduced signal for each integer of m=0 to (N−1), the offset amount calculation means has time interval storage means (for example, a memory 252B in FIG. 12) for storing the measured time intervals, average means (for example, an adder 257B and a divider 258B in FIG. 12) for obtaining the average value of the N time intervals stored in the time interval storage means, and subtraction means (for example, the subtractor 259B in FIG. 12) for performing subtraction of the average value obtained by the average means from the pth time interval value stored in the time interval storage means for each integer of p=1 to N, and the offset amount storage means stores the results of subtraction obtained by the subtraction means.

In the above described offset amount measuring apparatus, the time interval measurement means (for example, a time interval measuring portion 70C in FIG. 16) performs measurement of the time interval between the (n+m)th clock mark reproduced signal (n is any integer of 1 to N) and the (n+m+1)th clock mark reproduced signal for each integer of m=0 to (N+N/2−1), the offset amount calculation means has time interval storage means (for example, a memory 252C in FIG. 16) for storing the measured time intervals, addition means (for example, the adder 255C in FIG. 16) for performing addition of N/2 values from the pth time interval measured value to the (P+N/2)th time interval measured value stored in the time interval storage means for each integer of p=1 to N, addition results storage means (for example, a memory 256C in FIG. 16) for storing the results of addition obtained by the addition means, average means (for example, an adder 257C and a divider 258C in FIG. 16) for obtaining the average value of the N results of addition stored in the addition result storage means, and subtraction means (for example, the subtractor 259C in FIG. 16) for performing subtraction of the average value obtained by the average means from the kth result of addition stored in the addition result storage means for each integer of k=1 to N, and the offset amount storage means stores the results of subtraction performed by the subtraction means.

Further, the offset amount measuring apparatus of the present invention, in a disk apparatus, which has a disk provided with a home index signal recorded in a predetermined position of each circular data track to indicate the home position of the circular data track and N (N is an integer larger than 1) clock mark signals recorded around each circular data track at physically regular intervals and reads the home index signal and the clock mark signals from the circular data track with a head, is characterized in that it comprises time interval measurement means (for example, a time interval measuring portion 70D in FIG. 21) for measuring the time intervals between adjoining clock mark reproduced signals output from the head while the head is positioned at a distance of a predetermined radius from the center of rotation of the disk, first calculation means (for example, a comparator 302, maximum value memory 303, minimum value memory 304, and a calculator 305 in FIG. 21) for obtaining the distance between the center of the circular data track and the center of rotation of the disk from the time intervals between the clock mark reproduced signals measured by the time interval measurement means, phase difference derivation means (a counter 301 and a comparator 302 in FIG. 21) for deriving the phase difference between the position of the disk where the time interval measured by the time interval measurement means takes on a maximum value and the position where the home index signal is recorded, and second calculation means (for example, a memory 306 and a calculator 307 in FIG. 21) for calculating the offset amount of the disk in relation to the angular position of the disk from the distance obtained by the first calculation means and the phase difference derived by the phase difference derivation means.

BRIEF DESCRIPTION OF THE DRAWINGS

FIG. 6 is a diagram showing an example of the time interval between clock mark reproduced signals measured by a time interval measuring portion 70 structured as shown in FIG. 4.

FIG. 7 is a diagram showing an example of the offset amount stored in a memory 260 of an offset amount storing portion 26E structured as shown in FIG. 4 in relation to the angle of rotation of a disk.

DESCRIPTION OF THE PREFERRED EMBODIMENTS

Figure 1:
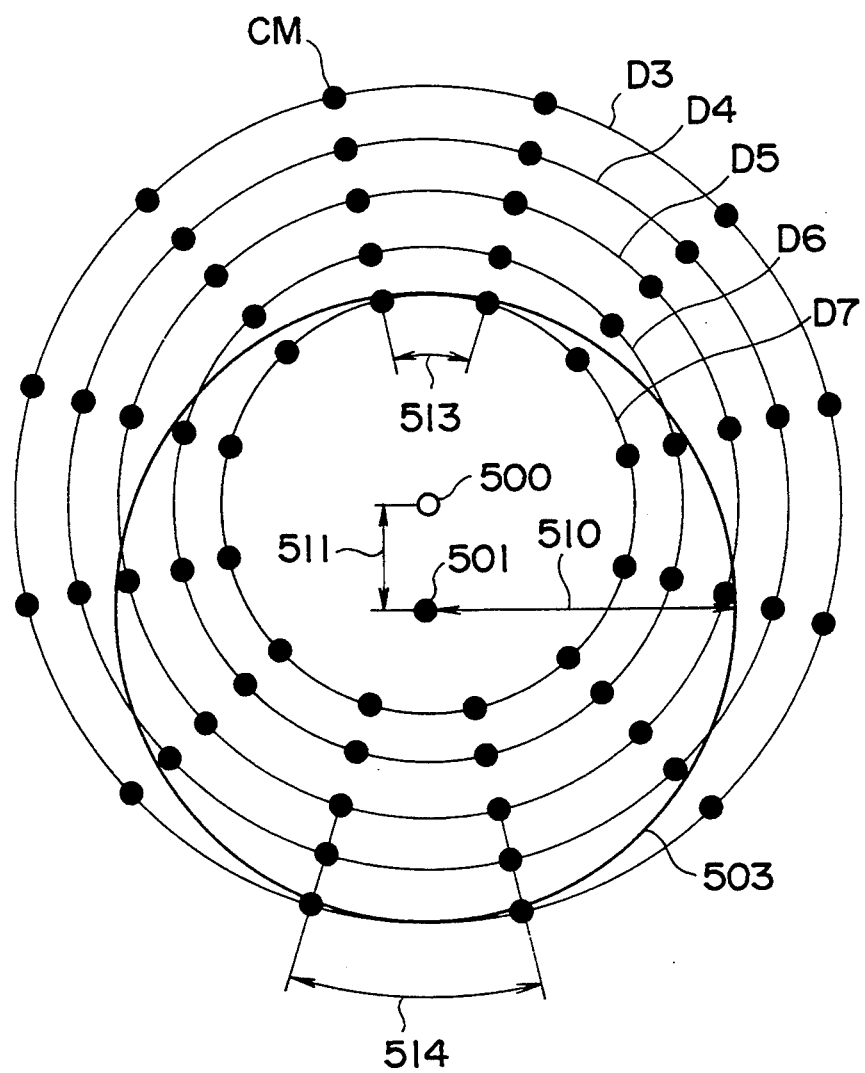
FIG. 1 is a diagram showing a relationship between a disk having N clock mark signals recorded around each circular data track at physically regular intervals and a record/reproduce head fixed in a position at a distance of a predetermined radius from the center of rotation of the disk chucked.

FIG. 1 is a diagram showing a relationship between a magnetic disk on which N clock mark signals are recorded round each circular data track at physically regular intervals and a locus of a record/reproduce head, i.e., a signal read head, fixed in a position at a distance of a predetermined radius from the center of rotation of the disk in a chucked state. Referring to FIG. 1, reference numeral 500 denotes the center of the circular data track and there are formed data tracks D3 to D7 concentrically with respect to the center 500 and there are formed N clock mark signals CM around each data track at physically regular intervals.

When a magnetic disk having circular data tracks as described above is chucked on a spindle motor revolving shaft 501, there is produced an offset 511. Reference numeral 503 denotes a circular locus of the record/reproduce head, i.e., the signal read head, fixed in a position at a distance of a predetermined radius 510 from the center of rotation 501 of the chucked disk. When the circular locus 503 comes closest to the center 500 of the circular data track, the time taken for the head to move a distance 513 between the clock mark signals CM on the circular data track which the circular locus 503 passes along is shortest, and when the circular locus 503 goes farthest away from the center 500 of the circular data track, the time taken for the head to move a distance 514 between the clock marks on the circular data track which the circular locus 503 passes along is longest. This is because the disk radius of rotation 510 is constant and hence the passing speed of the head is constant. Accordingly, by measuring the time interval between the clock mark reproduced signals reproduced by the record/reproduce head, i.e., the signal read head, fixed in a position at a distance of the predetermined radius 510 from the center of rotation 501 of the chucked disk, and utilizing the results of the measurement, the offset amount due to the offset 511 with respect to the disk angular position can be obtained.

Figure 3:
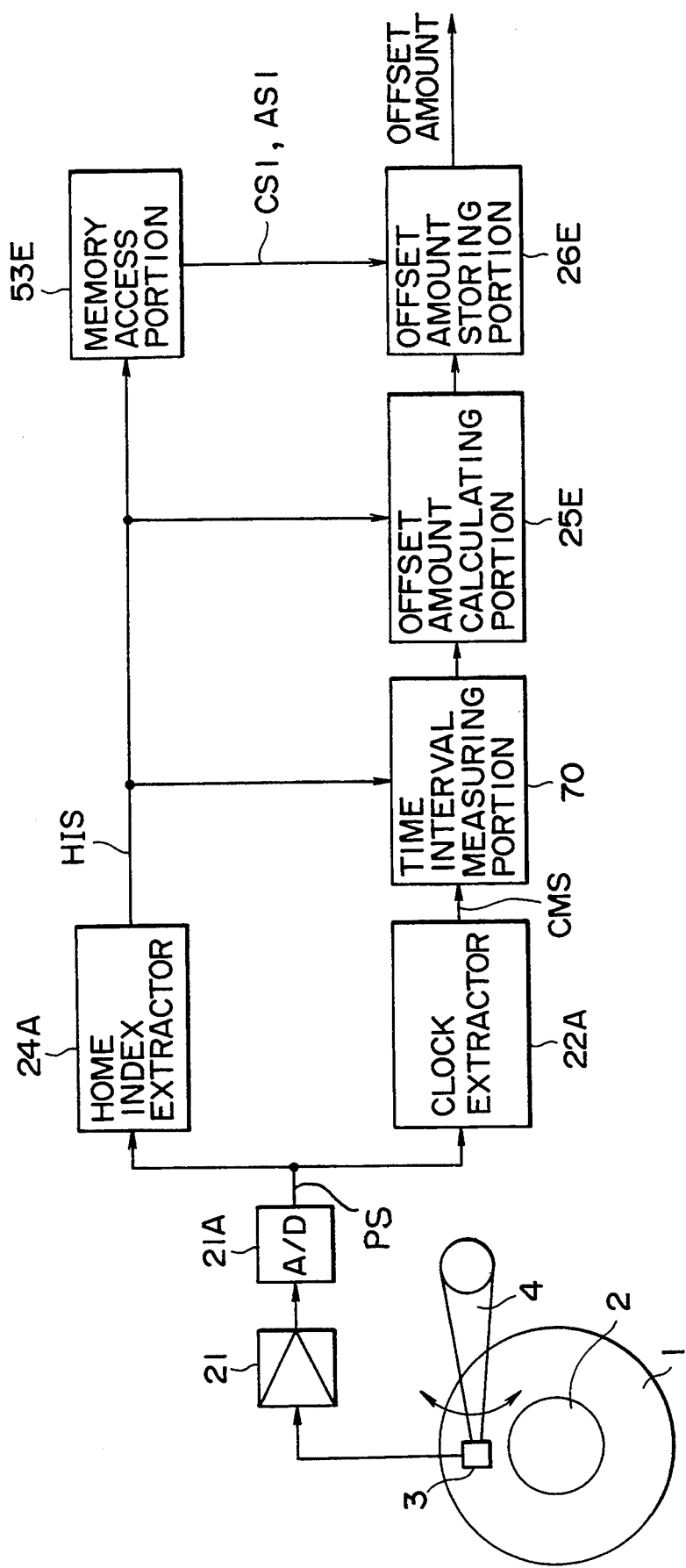
FIG. 3 is a block diagram showing the structure of a first embodiment of the offset amount measuring apparatus of the invention.

FIG. 3 shows the structure of a first embodiment of an offset amount measuring apparatus of the present invention. Referring to FIG. 3, a magnetic disk 1 is provided with N clock mark signals recorded around each circular data track at physically regular intervals. The magnetic disk 1 is chucked on a spindle shaft 2. A record/reproduce head 3 is attached to an arm 4 and moves over the magnetic disk 1 and performs recording/reproduction of signals.

A signal read by the head 3 is amplified by a reproducing amplifier 21 and then converted by an A/D converter 21A into a pulse signal PS at the TTL level. The pulse signal PS is supplied to a clock extractor 22A and a home index extractor 24A. The clock extractor 22A accepts the pulse signal PS and outputs a clock mark reproduced signal CMS. The home index extractor 24A reproduces a home index signal HIS, one signal of which is recorded at a predetermined point of each data track of the disk 1, and outputs the signal to a time interval measuring portion 70, an offset amount calculating portion 25E, and a memory access portion 53E.

The time interval measuring portion 70 measures the time interval between the clock mark reproduced signals CMS output from the clock extractor 22A starting with a signal CMS following the detected home index signal HIS. The offset amount calculating portion 25E calculates an offset amount with respect to an angle of rotation of the disk 1 (in each clock mark position referenced from the home index) from the time interval between the clock mark reproduced signals CMS using the home index signal HIS. The offset amount has the dimension of time.

The memory access portion 53E outputs a control signal CS1 and an address signal AS1 on the basis of the home index signal HIS. An offset amount storing portion 26E stores the offset amount output from the offset amount calculating portion 25E according to the control signal CS1 and address signal AS1 from the memory access portion 53E. The offset amount stored in the offset amount storing portion 26E is read according to the control signal CS1 and address signal AS1 output from the memory access portion 53E on the basis of the home index signal HIS. The offset amount output from the offset amount storing portion 26E can be said to correspond to the offset distance between the circular data track of the disk 1 and the head locus 503 (refer to FIG. 1). The offset distance here is the distance, resulting from the offset 511 produced when the disk is chucked (refer to FIG. 2), between the head locus 503 and the track 502 originally designed to be read, measured in their radial direction in an angular position of the disk.

Figure 4:
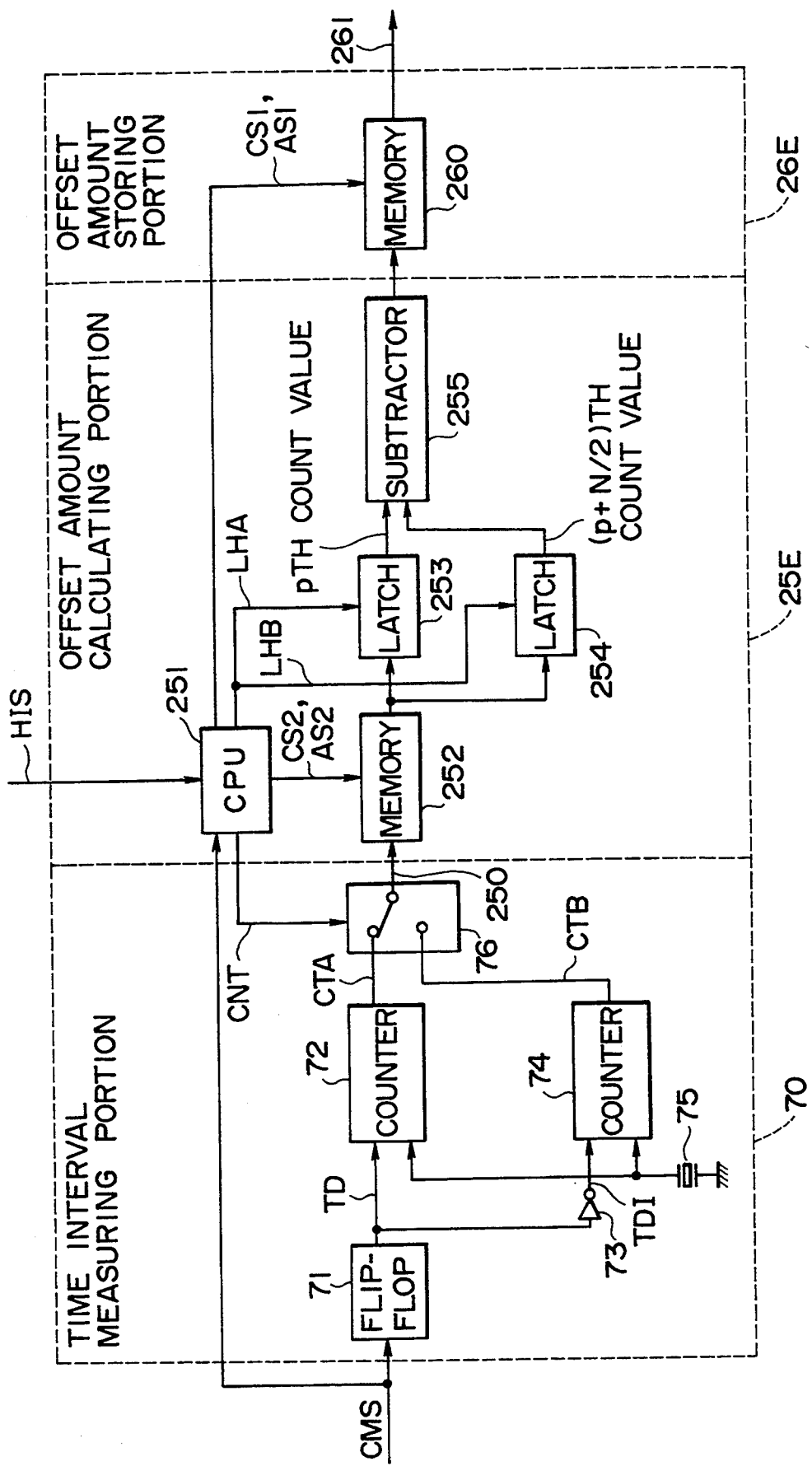
FIG. 4 is a block diagram showing a detailed structure of the embodiment shown in FIG. 3.

FIG. 4 shows a particular example of the structure of the time interval measuring portion 70, the offset amount calculating portion 25E, and the offset amount storing portion 26E shown in FIG. 3. In the example shown in FIG. 4, the time interval measuring portion 70 comprises a flip-flop 71, counter 72, inverter 73, counter 74, oscillator 75, and a switch 76. The offset amount calculating portion 25E comprises a CPU 251, memory 252, latches 253 and 254, and a subtractor 255. The offset amount storing portion 26E comprises a memory 260. The CPU 251 also has the function of the memory access portion 53E shown in FIG. 3.

The flip-flop 71, every time the clock mark reproduced signal CMS reproduced from the disk arrives, outputs a pulse signal TD changing between High and Low at the TTL level. The pulse signal TD is supplied, as it is, to the counter 72 and applied, inverted by the inverter 73, to the counter 74.

The counter 72 measures the time interval of the High period of the pulse signal TD using the oscillator 75 and outputs a time interval measured value CTA. On the other hand, the counter 74 counts the time interval of the High period of the pulse signal output from the inverter 73, i.e., the time interval of the Low period of the pulse signal TD, using the oscillator 75 and outputs a time interval measured value CTB.

The switch 76 alternately outputs the time interval measured value CTA output from the counter 72 and the time interval measured value CTB output from the counter 74 as a count value 250, according to a control signal CNT output from the CPU 251 on the basis of the home index signal HIS. The control signal CNT is a signal (High/Low signal) switching the switch 76, for example, according to odd/even values of the counts of the clock mark reproduced signals CMS referenced from the home index signal HIS.

The memory 252 successively stores (N+N/2) time interval measured values 250 supplied from the switch 76 according to a control signal CS2 and an address signal AS2 output from the CPU 251 on the basis of the home index signal HIS. The address signal AS2 is determined according to the count value of the signals CMS referenced from the signal HIS. The control signal CS2 is a signal operating the write and read functions for the memory 252 and it is switched from a write signal to a read signal upon completion of the reproduction of the clock mark.

The time interval measured value stored in the memory 252 is read according to the control signal CS2 and address signal AS2 output from the CPU 251. A pth time interval measured value readout is retained by the latch 253 according to a latch signal LHA output from the CPU 251. A (P+N/2)th time interval measured value readout is retained by the latch 254 according to a latch signal LHB output from the CPU 251.

The subtractor 255 subtracts the (P+N/2)th time interval measured value from the pth time interval measured value. The subtractor 255 performs the subtraction for each of p=1 to N. The N results of subtraction obtained from the subtractor 255 are successively stored into the memory 260 according to the control signal CS1 and address signal AS1 output from the CPU 251 on the basis of the home index signal HIS. The address signal AS1 is determined according to the count value of the signals CMS referenced from the signal HIS. The control signal CS1 is a signal operating the write and read functions for the memory 260 and it is switched from a write signal to a read signal upon completion of the reproduction of the clock mark.

Figure 2:
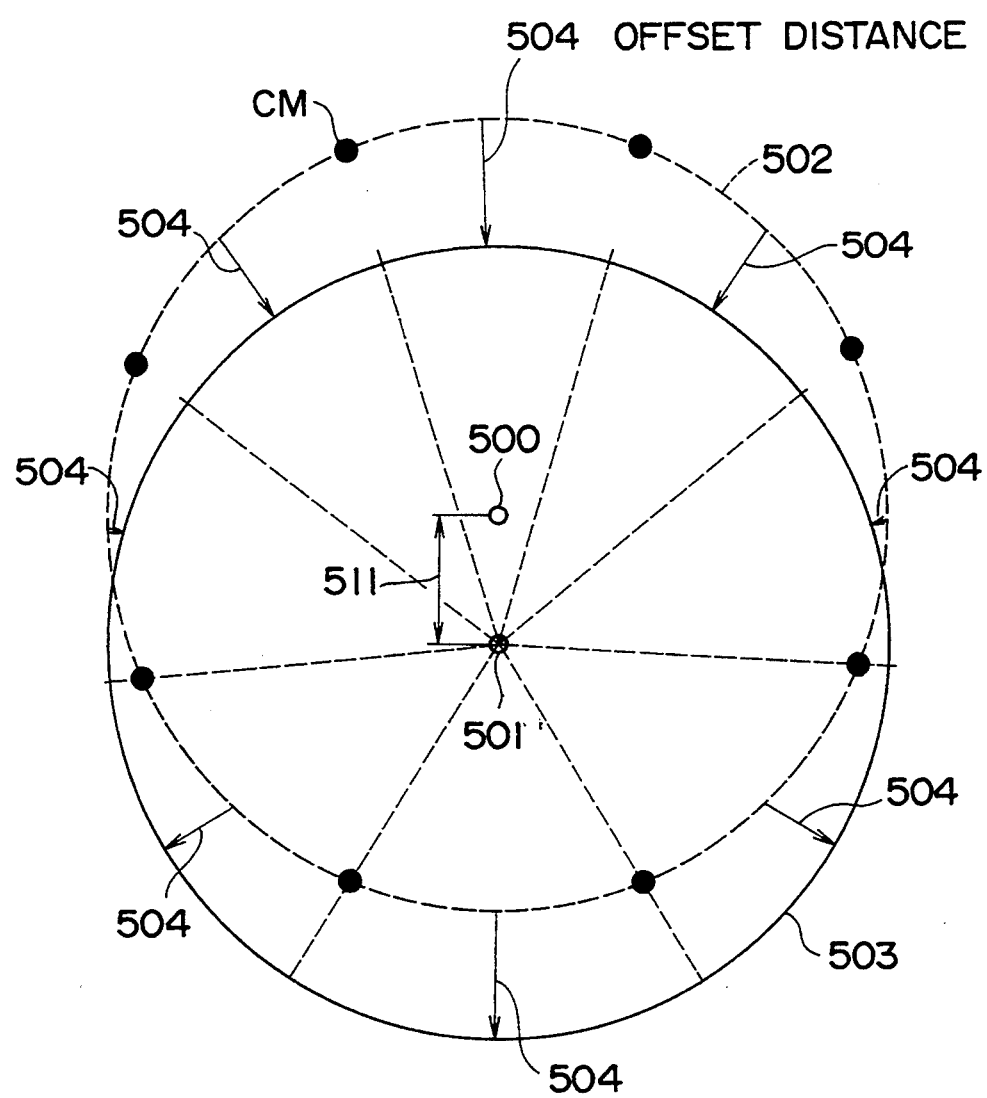
FIG. 2 is a diagram showing a relationship between a data track which is originally designed to be read by a head and an actual locus of the head.

The result of subtraction stored in the memory 260 is the offset amount (of which the dimension is time) corresponding to the angular position of the disk (the position of each clock mark referenced from the home index) and is equivalent to the distance due to the offset between the circular data track and the head locus 503 shown in FIG. 2.

Further, the result of subtraction stored in the memory 260 is read out as an offset amount 261 according to the control signal CS1 and address signal AS1 output from the CPU 251 on the basis of the home index signal HIS, and the data readout can be utilized as an offset distance table for correcting the offset.

Figure 5:
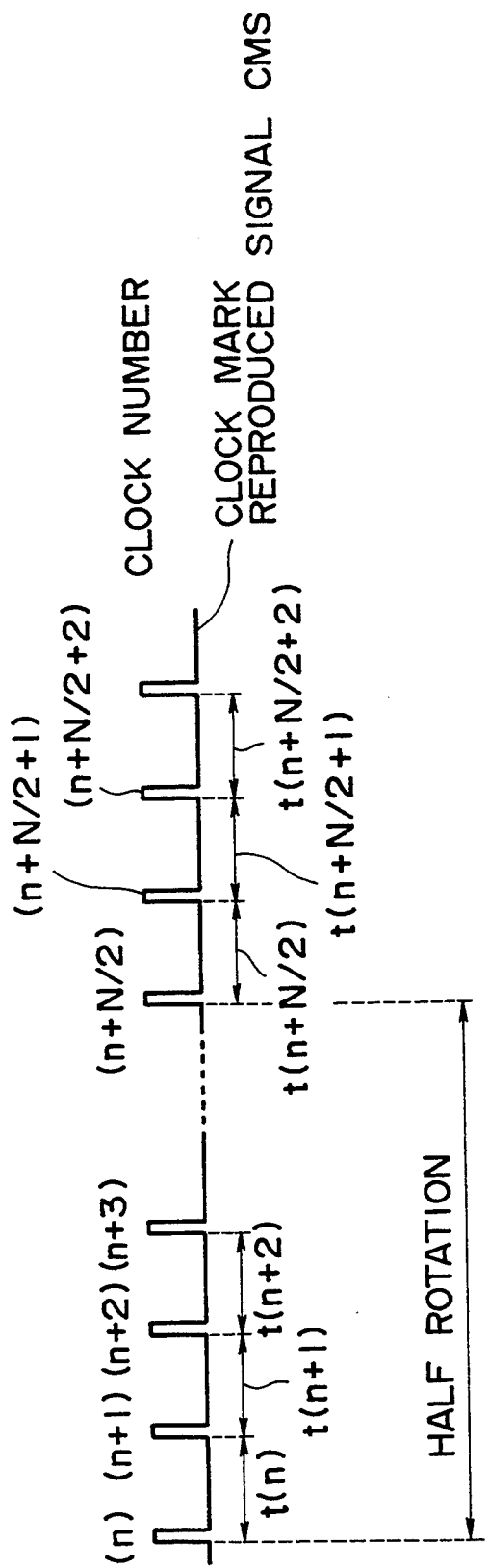
FIG. 5 is a diagram showing a relationship between a clock mark reproduced signal and measured time intervals in the example of the structure shown in FIG. 4.

FIG. 5 is a diagram showing a relationship between the clock mark reproduced signal CMS and the measured time intervals in the example of the structure shown in FIG. 4. Referring to FIG. 5, representing the count value of the time interval between the nth clock mark reproduced signal CMS and the (n+1)th clock mark reproduced signal CMS by t(n), if the count value at the time when the head locus 503 in FIG. 1 is farthest away from the center 500 of the circular data track is given by t(k), then the count value when the same is closest becomes t(k+N/2).

FIG. 6 shows an example of the time interval between the clock mark reproduced signals measured by the time interval measuring portion 70 structured as shown in FIG. 4, i.e., it shows the train of count values 250 stored in the memory 252 in relation to data numbers. In FIG. 6, the count value when the head locus 503 in FIG. 1 is farthest away from the center of the circular data track 500 is t(k) and that when it is closest is t(k+N/2).

FIG. 7 shows an example of the offset amount stored in the memory 260 of the offset amount storing portion 26B structured as shown in FIG. 4 in relation to the angle of rotation of the disk, i.e., it shows the distance due to the offset between the circular data track and the head locus 503 (refer to FIG. 1), which is the offset measurement result obtained by subtracting the (P+N/2)th time interval measured value from the pth time interval measured value as described above. The train of data 261 stored in the memory 260 can be utilized as an offset distance table in relation to the angular position of the disk for correcting the offset.

Figure 8:
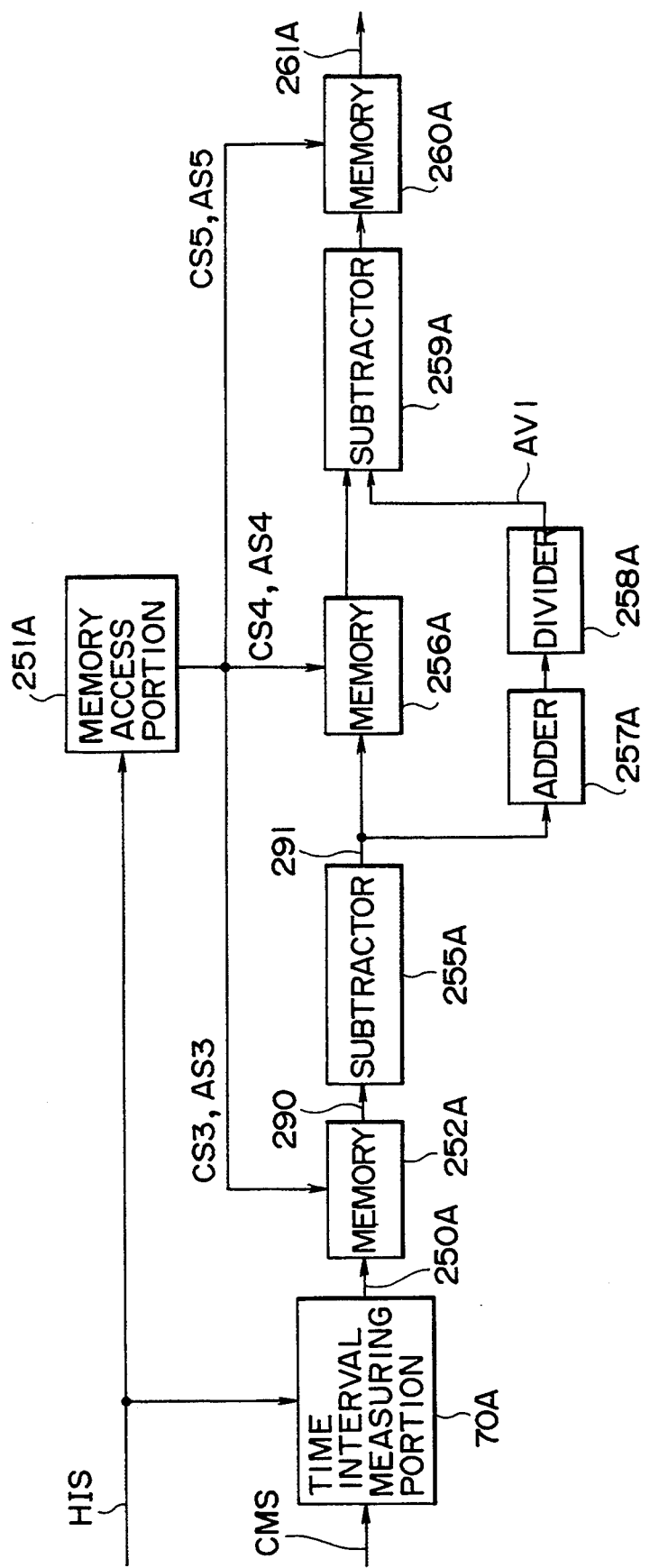
FIG. 8 is a block diagram showing the structure of a second embodiment of the offset amount measuring apparatus of the invention.

FIG. 8 shows the structure of a second embodiment of the offset amount measuring apparatus according to the present invention. A time interval measuring portion 70A, using the home index signal HIS, performs measurement of the time interval between the nth clock mark reproduced signal CMS and the (n+m)th clock mark reproduced signal CMS reproduced from the disk for each integer of m=1 to (N+N/2). The time interval measured values measured by the time interval measuring portion 70A are fed as count values 250A and successively stored into a memory 252A according to a control signal CS3 and an address signal AS3 output from a memory access portion 251A on the basis of the home index signal HIS.

The time interval measured values stored in the memory 252A are read according to the control signal CS3 and address signal AS3 output from the memory access portion 251A on the basis of the home index signal HIS. A subtractor 255A carries out subtraction of the (p+N/2)th time interval measured value from the pth time interval measured value readout, for each integer of p=1 to N. The results of subtraction obtained by the subtractor 255A are successively stored into a memory 256A according to a control signal CS4 and an address signal AS4 output from the memory access portion 251A on the basis of the home index signal HIS.

Meanwhile, the N sets of the results of subtraction performed in the subtractor 255A are added up in an adder 257A and the added result by the adder 257A is divided by N in a divider 258A and, thereby, an average value AV1 is output therefrom.

The results of subtraction stored in the memory 256A are successively read according to the control signal CS4 and address signal AS4 output from the memory access portion 251A on the basis of the home index signal HIS. A subtractor 259A carries out subtraction of the average value AV1 from the readout kth result of subtraction for each integer of k=1 to N. The results of subtraction obtained by the subtractor 259A are successively stored into a memory 260A according to a control signal CS5 and an address signal AS5 output from the memory access portion 251A on the basis of the home index signal HIS.

The result of subtraction stored in the memory 260A is the offset amount with respect to an angular position of the disk and represents the distance resulting from the offset between the circular data track and the head locus 503 (refer to FIG. 1), and the values stored are readout as the offset amounts 261A according to the control signal CS5 and address signal AS5 output from the memory access portion 251A on the basis of the home index signal HIS so as to be utilized as an offset distance table for performing correction of the offset. The embodiment of FIG. 8 can reduce noise from that produced in the embodiment shown in FIG. 4.

Figure 9:
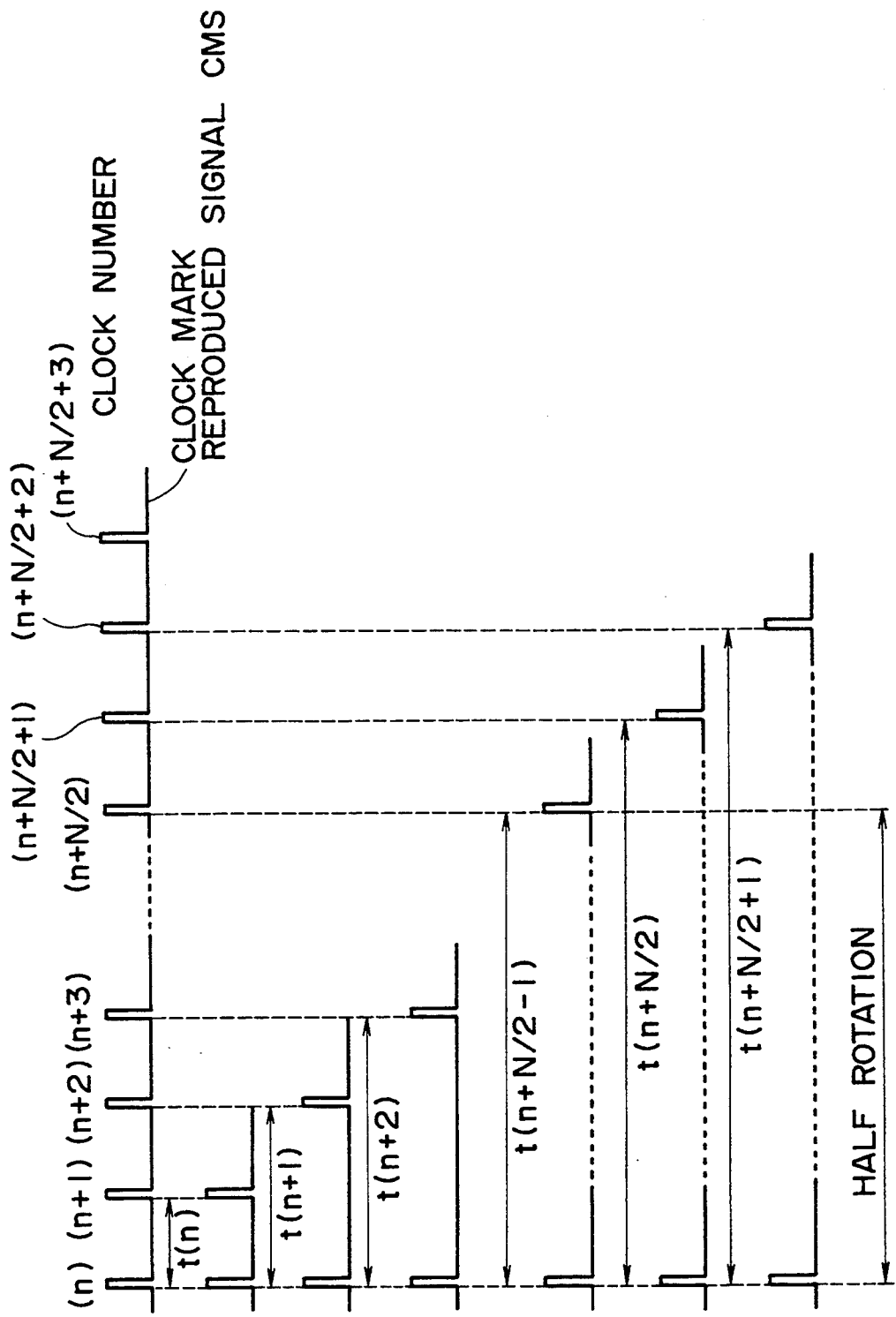
FIG. 9 is a diagram showing a relationship between a clock mark reproduced signal and measured time intervals in the second embodiment of the invention shown in FIG. 8.

FIG. 9 is a diagram showing the relationship between the clock mark reproduced signal and the measured time intervals in the second embodiment of the invention shown in FIG. 8. Referring to FIG. 9, the time interval between the nth clock mark reproduced signal CMS and the (n+m)th clock mark reproduced signal CMS is represented by t(n+m−1).

Figure 10:
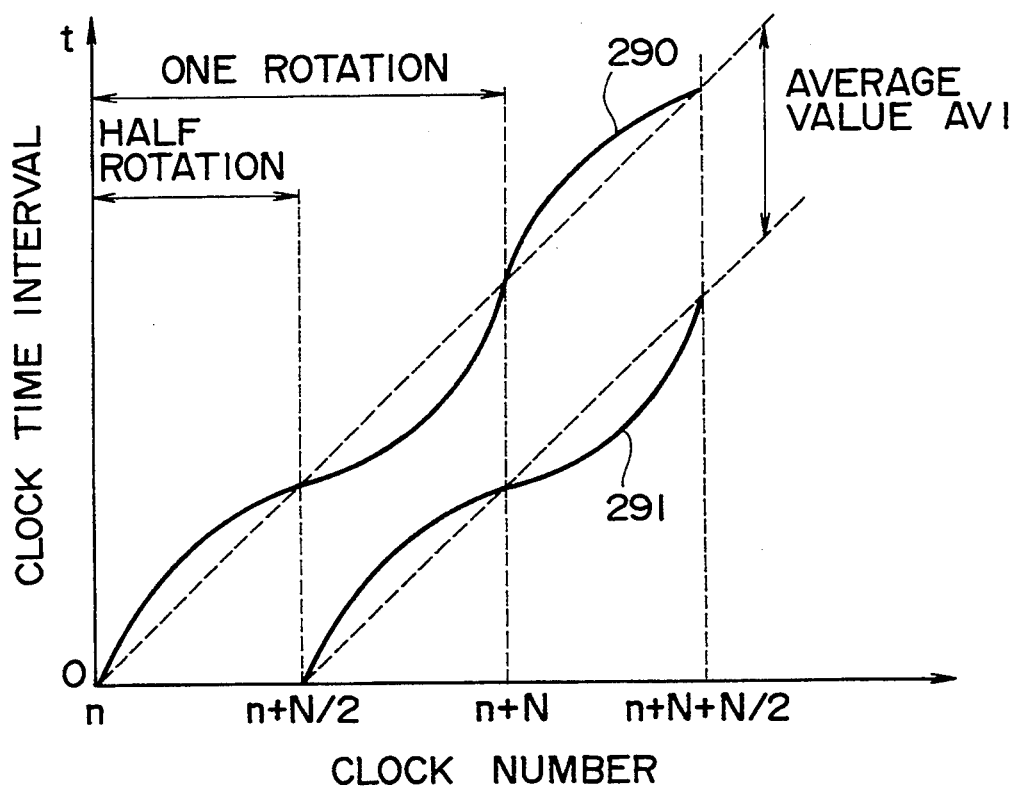
FIG. 10 is a diagram showing the time interval 290 between clock mark reproduced signals measured by a time interval measuring portion 70A and stored in a memory 252A, the time interval measured value 291 obtained by subtraction in a subtractor 255A, and the average value AV1 output from a divider 258A in the second embodiment shown in FIG. 8.

FIG. 10 is a diagram showing the time intervals 290 of the clock mark reproduced signal measured by the time interval measuring portion 70A and stored in the memory 252A, the time interval measured values 291 obtained by subtraction performed in the subtractor 255A, and the average value AV1 output from the divider 258A in the second embodiment of the invention of FIG. 8 in relation to the clock number.

Figure 11:
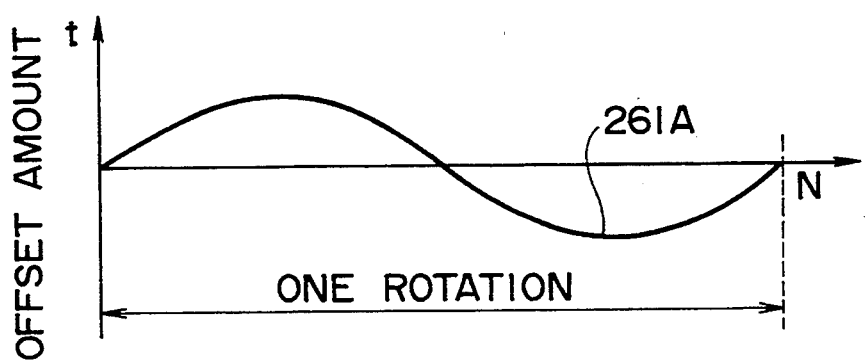
FIG. 11 is a diagram showing an example of the offset amount stored in a memory 260A in the second embodiment of the invention shown in FIG. 8 in relation to the angle of rotation of a disk.

FIG. 11 shows an example of the offset amount stored in the memory 260A in the embodiment of FIG. 8 in relation to the angle of rotation of the disk, i.e., the distance in the radial direction resulting from the offset between the circular data track designed to be read when there is no offset and the actual head locus 503 (refer to FIG. 1). The train of data 261A stored in the memory 260A can be utilized as an offset distance table with respect to the angular position of the disk for correcting the offset amount.

Figure 12:
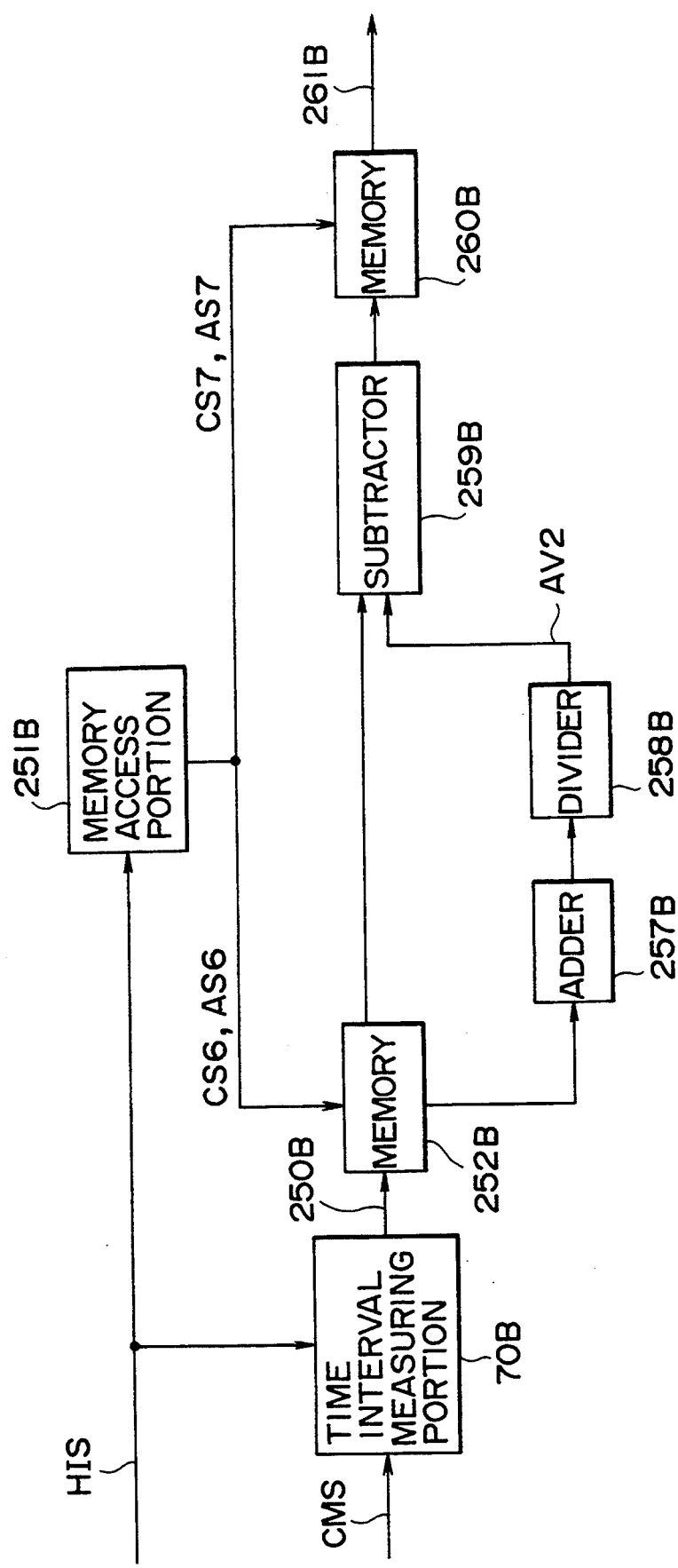
FIG. 12 is a block diagram showing the structure of a third embodiment of the offset amount measuring apparatus of the invention.

FIG. 12 shows the structure of a third embodiment of the offset amount measuring apparatus of the present invention. A time interval measuring portion 70B, using the home index signal HIS, measures the time interval between the (n+m)th clock mark reproduced signal CMS and the (n+m+N/2)th clock mark reproduced signal CMS reproduced from the disk for each integer of m=0 to (N−1). The time interval measured values measured by the time interval measuring portion 70B are fed as count values 250B and successively stored into a memory 252B according to a control signal CS6 and an address signal AS6 output from a memory access portion 251B on the basis of the home index signal HIS.

The time interval measured values stored in the memory 252B are read according to the control signal CS6 and address signal AS6 output from the memory access portion 251B on the basis of the home index signal HIS. N sets of the time interval measured values readout from the memory 252B are added up in an adder 257B and the result of addition obtained in the adder 257B is divided by N in a divider 258B and, thereby, an average value AV2 is output therefrom.

A subtractor 259B carries out the subtraction of the average value AV2 from the pth time interval measured value readout from the memory 252B for each integer of p=1 to N. The results of subtraction obtained in the subtractor 259B are successively stored into a memory 260B according to a control signal CS7 and an address signal AS7 output from the memory access portion 251B on the basis of the home index signal HIS.

The result of subtraction stored in the memory 260B is the offset amount with respect to an angular position of the disk and represents the distance resulting from the offset between the circular data track and the head locus 503 (refer to FIG. 1), and the values stored are read as the offset amounts 261B according to the control signal CS7 and address signal AS7 output from the memory access portion 251B on the basis of the home index signal HIS so as to be utilized as an offset distance table for performing correction of the offset. In the embodiment shown in FIG. 12, the number of the counters measuring the time interval can be reduced from that required in the embodiment shown in FIG. 8.

Figure 13:
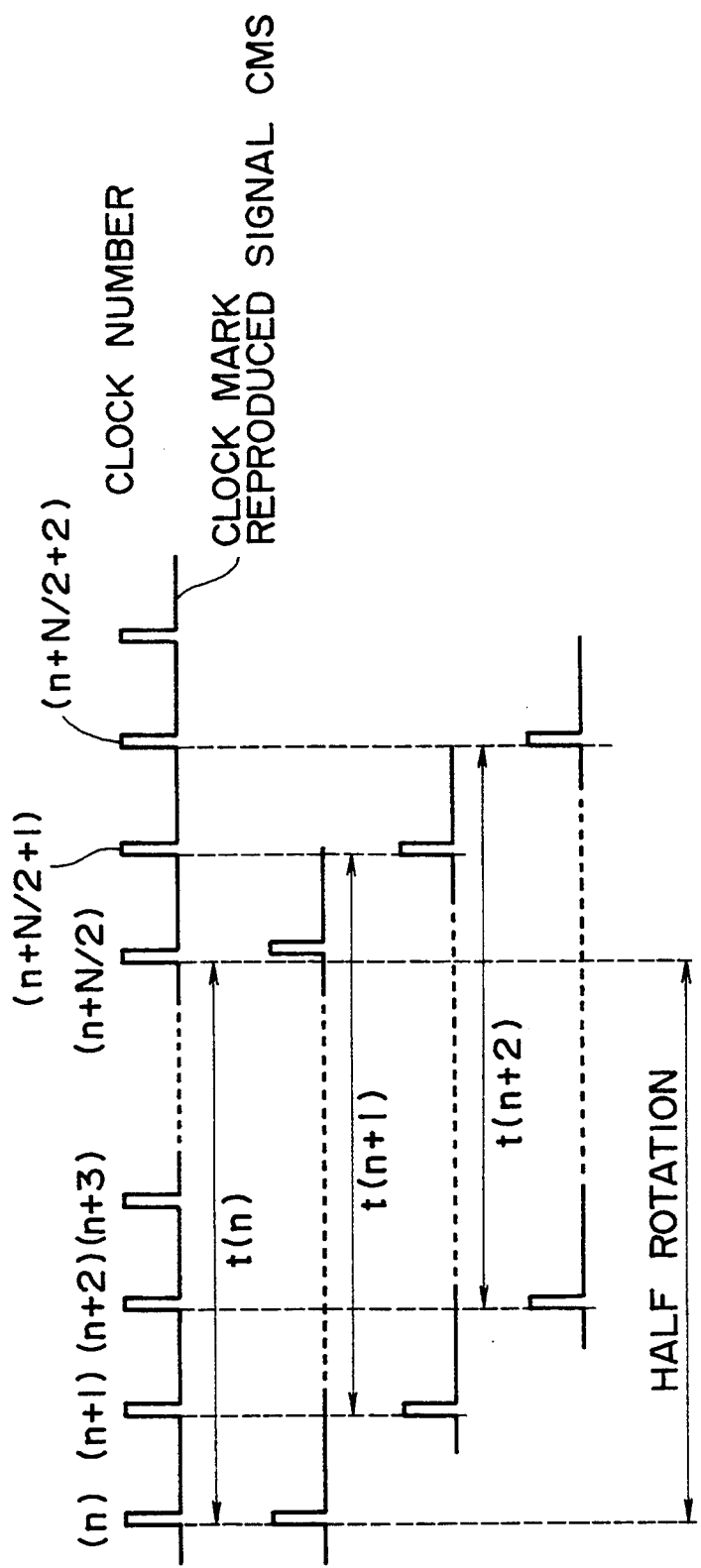
FIG. 13 is a diagram showing a relationship between a clock mark reproduced signal and measured time intervals in the third embodiment of the invention shown in FIG. 12.

FIG. 13 is a diagram showing the relationship between the clock mark reproduced signal and the measured time intervals in the third embodiment of the invention of FIG. 12. Referring to FIG. 13, the time interval between the nth clock mark reproduced signal CMS and the (n+N/2)th clock mark reproduced signal CMS is represented by t(n).

Figure 14:
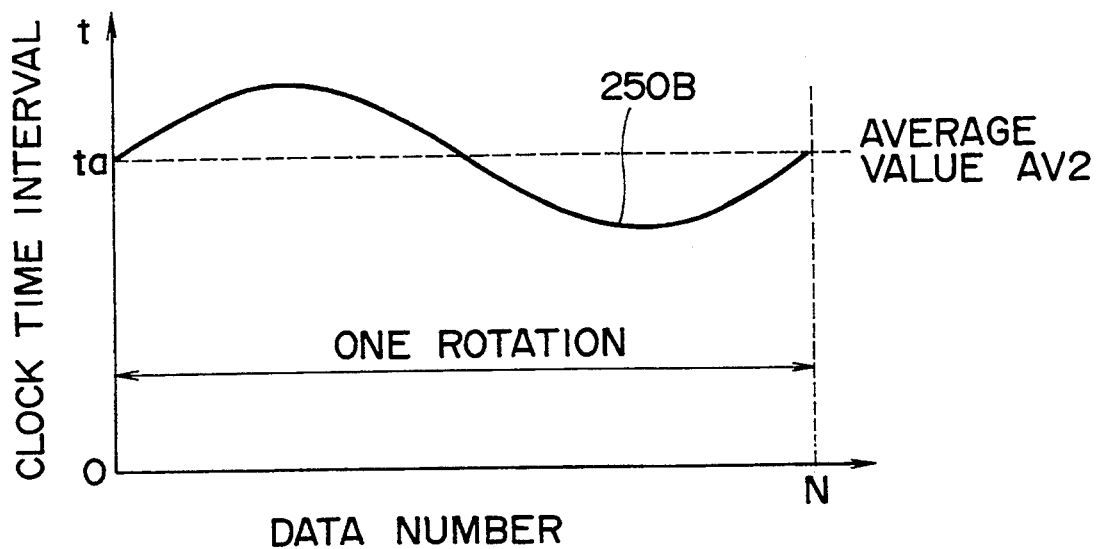
FIG. 14 is a diagram showing the time interval measured value 250B measured by a time interval measuring portion 70B and stored in a memory 252B and the average value AV2 output from a divider 258B in the third embodiment shown in FIG. 12.

FIG. 14 is a diagram showing the time interval measured value 250B between the clock mark reproduced signals measured by the time interval measuring portion 70B and stored in the memory 252B as well as the average values AV2 output from the divider 258B in the third embodiment of the invention shown in FIG. 12 in relation to the data number.

Figure 15:
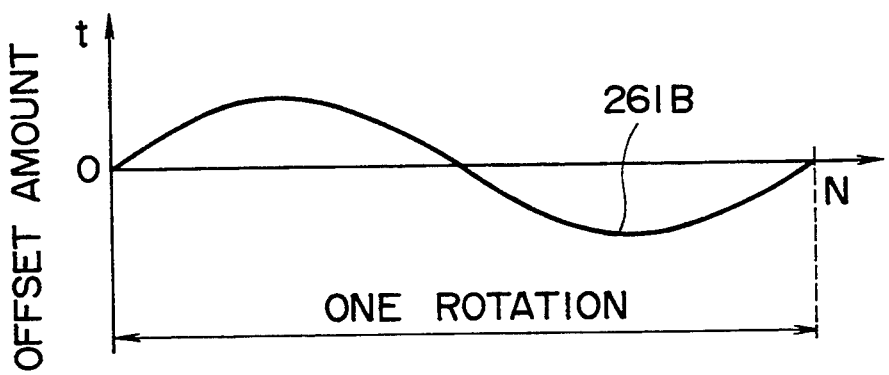
FIG. 15 is a diagram showing an example of the offset amount stored in a memory 260B in the third embodiment of the invention shown in FIG. 12 in relation to the angle of rotation of a disk.

FIG. 15 shows an example of the offset amount 261B stored in the memory 260B in the third embodiment of the invention of FIG. 12 in relation to the angle of rotation of the disk, i.e., the distance resulting from the offset between the circular data track and the head locus 503 (refer to FIG. 1). The train of data 261B stored in the memory 260B can be utilized as an offset distance table with respect to the angular position of the disk for correcting the offset amount.

Figure 16:
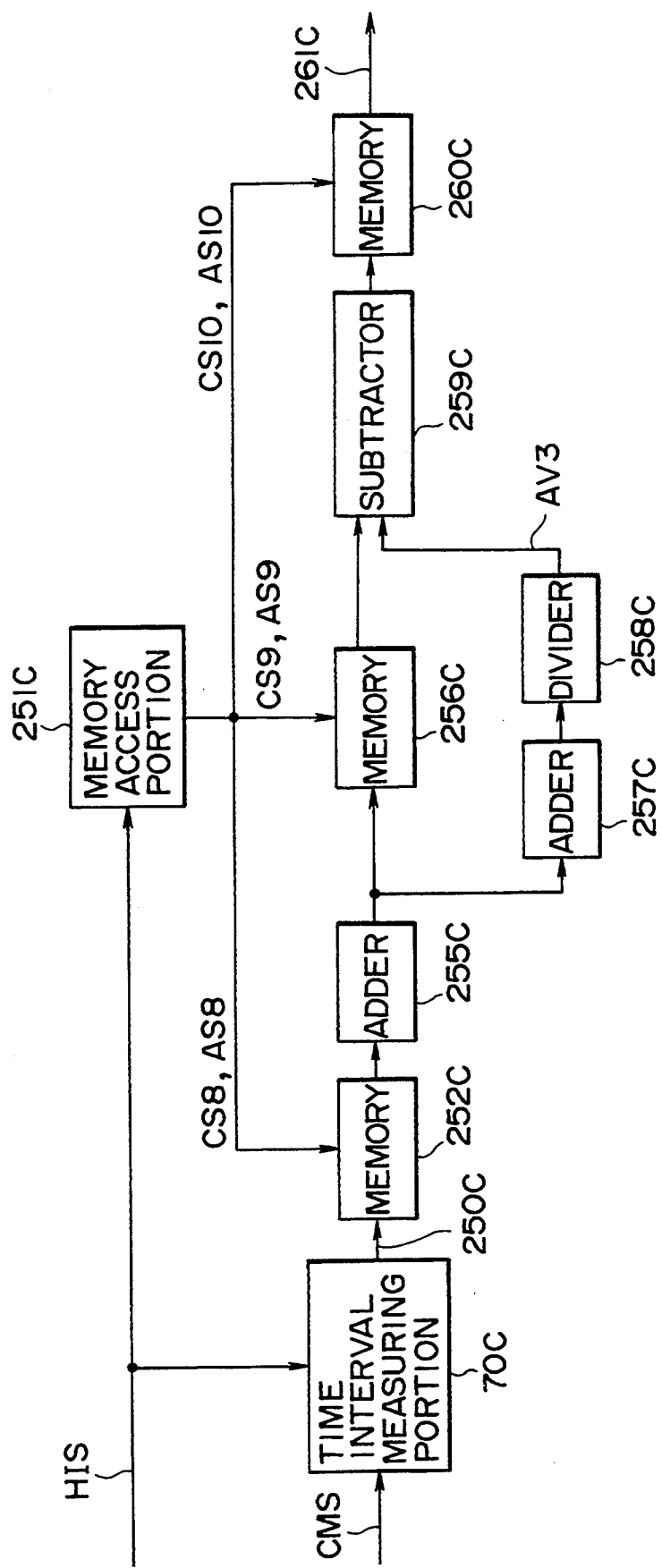
FIG. 16 is a block diagram showing structure of a fourth embodiment of the offset amount measuring apparatus of the invention.

FIG. 16 shows the structure of a fourth embodiment of the offset amount measuring apparatus of the present invention. A time interval measuring portion 70C, using the home index signal HIS, measures the time interval between the (n+m)th clock mark reproduced signal CMS (n is any integer of 1 to N) and the (n+m+1)th clock mark reproduced signal CMS reproduced from the disk for each integer of m=0 to (N+N/2−1). The time interval measured values measured by the time interval measuring portion 70C are fed as count values 250C and successively stored into a memory 252C according to a control signal CS8 and an address signal AS8 output from a memory access portion 251C on the basis of the home index signal HIS.

The time interval measured values stored in the memory 252C are read according to the control signal CS8 and address signal AS8 output from the memory access portion 251C on the basis of the home index signal HIS. An adder 255C carries out addition of N/2 sets of the time interval measured values from the pth time interval measured value to the (p+N/2)th time interval measured value readout, for each integer of p=1 to N. The results of addition obtained in the adder 255C are successively stored into a memory 256C according to a control signal CS9 and an address signal AS9 output from the memory access portion 251C on the basis of the home index signal HIS.

Meanwhile, N sets of the results of addition obtained by the adder 255C are added up in an adder 257C and the added result by the adder 257C is divided by N in a divider 258C and, thereby, an average value AV3 is output therefrom.

The results of addition stored in the memory 256C are successively read according to the control signal CS9 and address signal AS9 output from the memory access portion 251C on the basis of the home index signal HIS. A subtractor 259C carries out the subtraction of the average value AV3 from the kth result of addition readout, for each integer of k=1 to N. The results of subtraction obtained in the subtractor 259C are successively stored into a memory 260C according to a control signal CS10 and an address signal AS10 output from the memory access portion 251C on the basis of the home index signal HIS.

The result of subtraction stored in the memory 260C is the offset amount with respect to an angular position of the disk and represents the distance resulting from the offset between the circular data track and the head locus 503 (refer to FIG. 1), and the values stored are readout as the offset amounts 261C according to the control signal CS10 and address signal AS10 output from the memory access portion 251C on the basis of the home index signal HIS so as to be utilized as an offset distance table for performing correction of the offset. Thus, the embodiment shown in FIG. 16 can reduce noise from that produced in the embodiment shown in FIG. 3 and FIG. 4 and can further reduce the number of the counters for measuring the time intervals from that required in the embodiment shown in FIG. 12.

Figure 17:
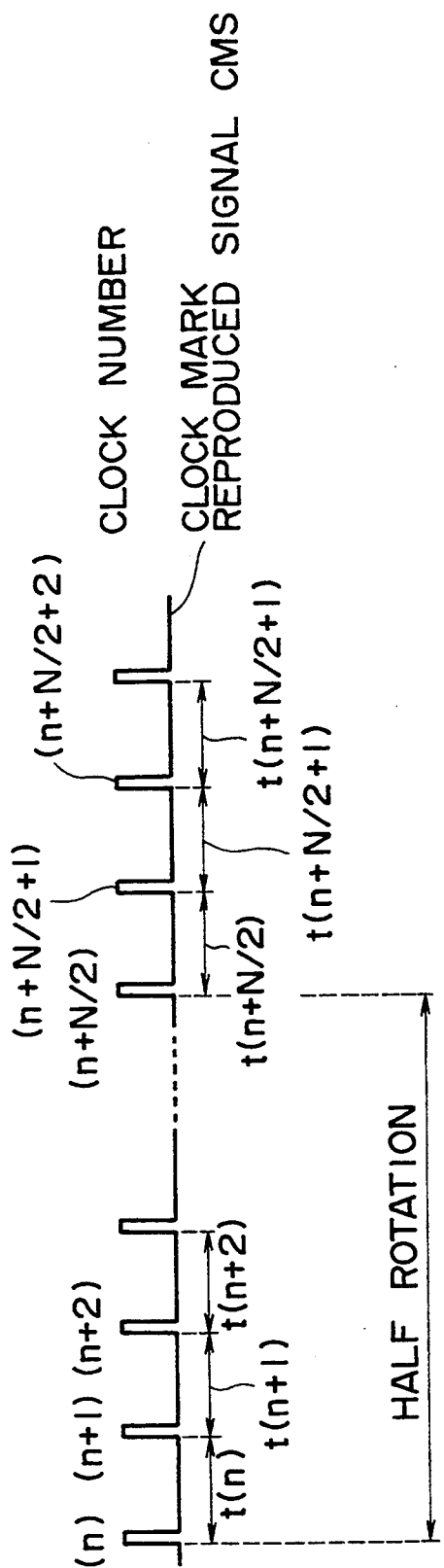
FIG. 17 is a diagram showing a relationship between a clock mark reproduced signal and measured time intervals in the fourth embodiment of the invention shown in FIG. 16.

FIG. 17 is a diagram showing the relationship between the clock mark reproduced signal and the measured time intervals 250C in the fourth embodiment of the invention of FIG. 16. Referring to FIG. 17, the time interval between the nth clock mark reproduced signal CMS and the (n+1)th clock mark reproduced signal CMS is represented by t(n).

Figure 18:
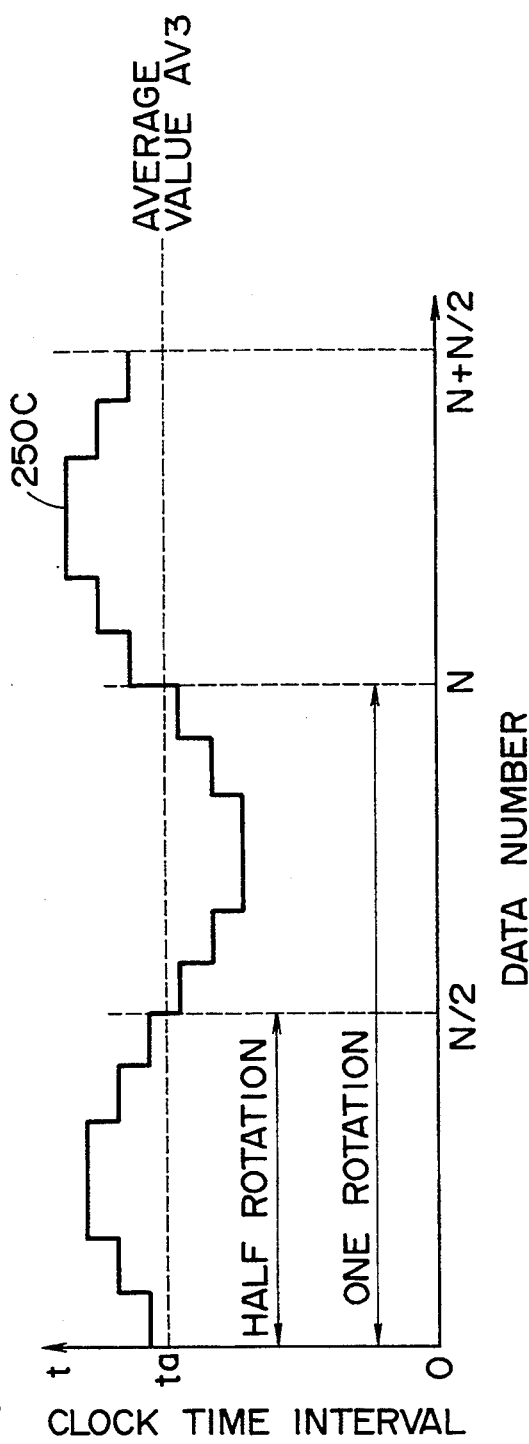
FIG. 18 is a diagram showing the time interval measured value 250C measured by a time interval measuring portion 70C and stored in a memory 252C and the average value AV3 output from a divider 258C in the fourth embodiment shown in FIG. 16.

FIG. 18 is a diagram showing the time intervals 250C between the clock mark reproduced signals stored in the memory 252C and the average value AV3 output from the divider 258C in the fourth embodiment of the invention of FIG. 16. The time interval measuring portion 70C measures the minimum unit of time which the measurement means has. When the minimum unit of time is coarse with respect to the offset amount, the measured train of time interval data 250C takes on a stepped form with respect to the angular position of the disk. When the number N/2 of the time interval data 250C, the train of which takes on a stepped form, added up in the adder 255C is sufficiently large, then, the offset information with respect to the angular position of the disk can be obtained in a smooth form.

Figure 19:
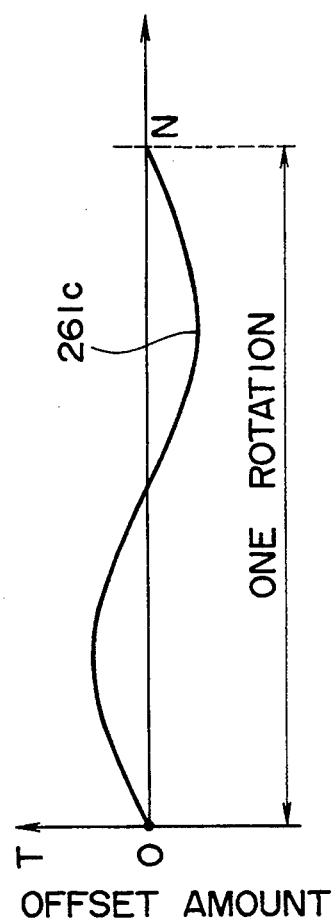
FIG. 19 is a diagram showing an example of the offset amount stored in a memory 260C in the fourth embodiment of the invention shown in FIG. 16 in relation to the angle of rotation of a disk.

FIG. 19 shows an example of the offset amount 261C stored in the memory 260C in the fourth embodiment of the invention of FIG. 16 in relation to the angle of rotation of the disk, i.e., the distance resulting from the offset between the circular data track and the head locus 503 (refer to FIG. 1). The train of data 261C stored in the memory 260C can be utilized as an offset distance table with respect to the angular position of the disk for correcting the offset amount.

Figure 20:
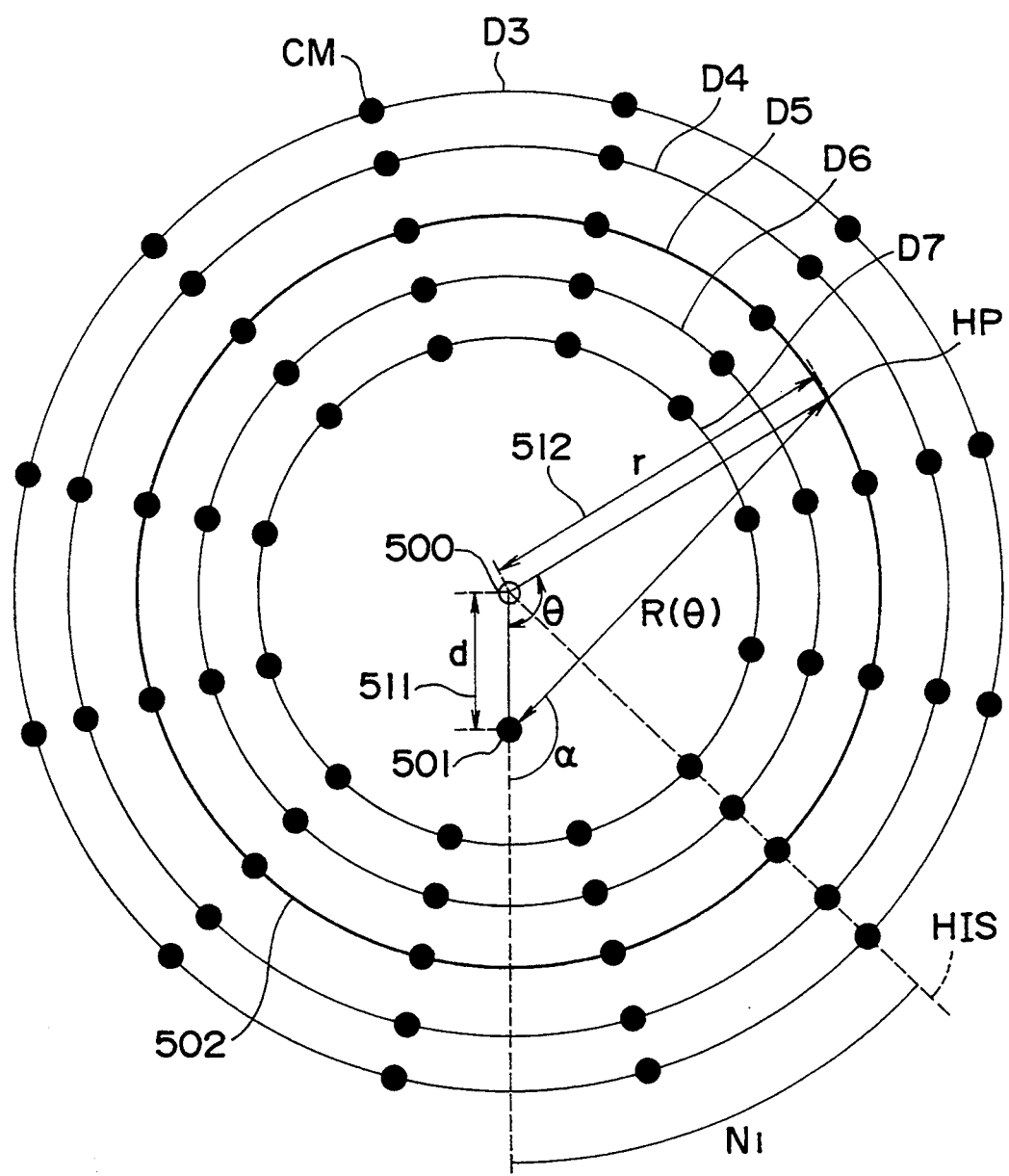
FIG. 20 is a diagram showing N clock marks recorded around each circular data track of a disk at physically regular intervals and changes in the radius of a record/reproduce head, i.e., a signal read head, traveling to read the same track resulting from an offset between the center of the circular data track and the center of the revolving spindle.

FIG. 20 shows N clock marks recorded around each circular data track of a magnetic disk at physically regular intervals and changes in the radius of a record/reproduce head, i.e., signal read head, traveling to read the same track resulting from an offset between the center of the circular data track and the center of the revolving spindle. Referring to FIG. 20, corresponding portions to those in FIG. 1 are denoted by corresponding reference numerals. If an offset 511 is produced when the disk is chucked on the revolving shaft 501 of the spindle motor, the signal read head traveling along the same track (for example, the circular data track D5=track 502) comes to have a non-constant traveling radius from the center 501 of the center of rotation of the disk.

Now, if the offset distance between the center 500 of the data track and the center 501 of the revolving shaft of the spindle motor is represented by d, the radial distance 512 of the circular data track from the center 500 of the track is represented by r, the angle formed between the segment connecting the center 500 of the data track and the position HP of the traveling head and the segment connecting the center 500 of the data track and the center 501 of the revolving spindle is represented by $\theta$, and the revolving angular speed of the spindle is represented by $\omega$, then the distance $R(\theta)$ from the center 501 of the revolving spindle to the position of the traveling head is given by expression (1) below $$R(\theta)=(r^2+d^2-2rd\cdot\cos\theta)^{\frac{1}{2}} \qquad (1)$$

Then, if the angle formed between the segment connecting the center 501 of the revolving spindle and the position HP of the traveling head and the segment connecting the center 500 of the data track and the center 501 of the revolving spindle is represented by $\alpha$, the number of clock marks counted from the clock mark signal CM in the extended line of the line connecting the center 500 of the data track and the center 501 of the revolving spindle to the home index signal HIS is represented by N1, and the ordinal number of the clock mark reproduced signal CMS from the home index signal HIS is represented by n, then, the angle $\theta$, which is virtually equivalent to the angle $\alpha$ because r is much greater than d, is given by expression (2) below $$\theta=\omega(n-N1)/N \qquad (2)$$

Substituting (2) into (1) and representing the speed of the head traveling along the track by v(n), we obtain $$v(n)=(r^2+d^2-2rd\cdot\cos(\omega(n-N1)/N))^{\frac{1}{2}}\cdot\omega \qquad (3)$$

Since the distance between clock marks along the same track is $r \cdot 2\pi/N$, the time interval T(n) to travel from one clock mark to the next is given by expression (4) below $$T(n) = (r \cdot 2\pi/N)/v(n)$$
$$= 2\pi r/(N\omega)/(r^2 + d^2 - 2rd \cdot \cos(\omega(n - N1)/N))^{\frac{1}{2}} \quad (4)$$

From expression (4), it is known that the time interval T(n) between two clock marks is at its maximum where n=N1 and it is at its minimum where n=N1+N/2.

Here, the number N of the clock marks along the circular data track and the revolving angular speed $\omega$ of the spindle are such that are previously given as design values. Therefore, it becomes possible to obtain the offset correcting values along one whole rotation of the disk from expression (4) by using two values, i.e., the offset distance d relative to an arbitrary head traveling radius r and the clock number N1 from the home index signal HIS recorded on the data track to the point where the mark-to-mark time interval is at its maximum.

Referring to FIG. 1, when the head traveling radius 510 is fixed to a specific value R and the head reproduces clock marks by crossing the data tracks D3 to D7, then if the offset distance 511 is represented by d and the head traveling speed by rotation of the disk is expressed by $R\omega$, then the time interval for reproducing clock marks t13 which is measured as the minimum value is given by expression (5) below $$t13 = (R-d) \cdot 2\pi/(N \cdot R\omega) \quad (5)$$

Likewise, the time interval for reproducing clock marks t14 which is measured as the maximum value is given by expression (6) below $$t14 = (R+d) \cdot 2\pi/(N \cdot R\omega) \quad (6)$$

From expressions (5) and (6), the maximum variance of the clock mark reproducing time interval is given by the following expression (7)

$$t14 - t13 = 2d \cdot 2\pi/(N \cdot R\omega) \quad (7)$$

By transforming expression (7), we obtain expression (8)

$$d = (t14 - t13) \cdot N \cdot R\omega/4\pi \quad (8)$$

Thus, by measuring the maximum and minimum values of the clock mark reproducing time interval and the traveling radius of the head R at that time, the offset distance d can be obtained from expression (8).

Figure 21:
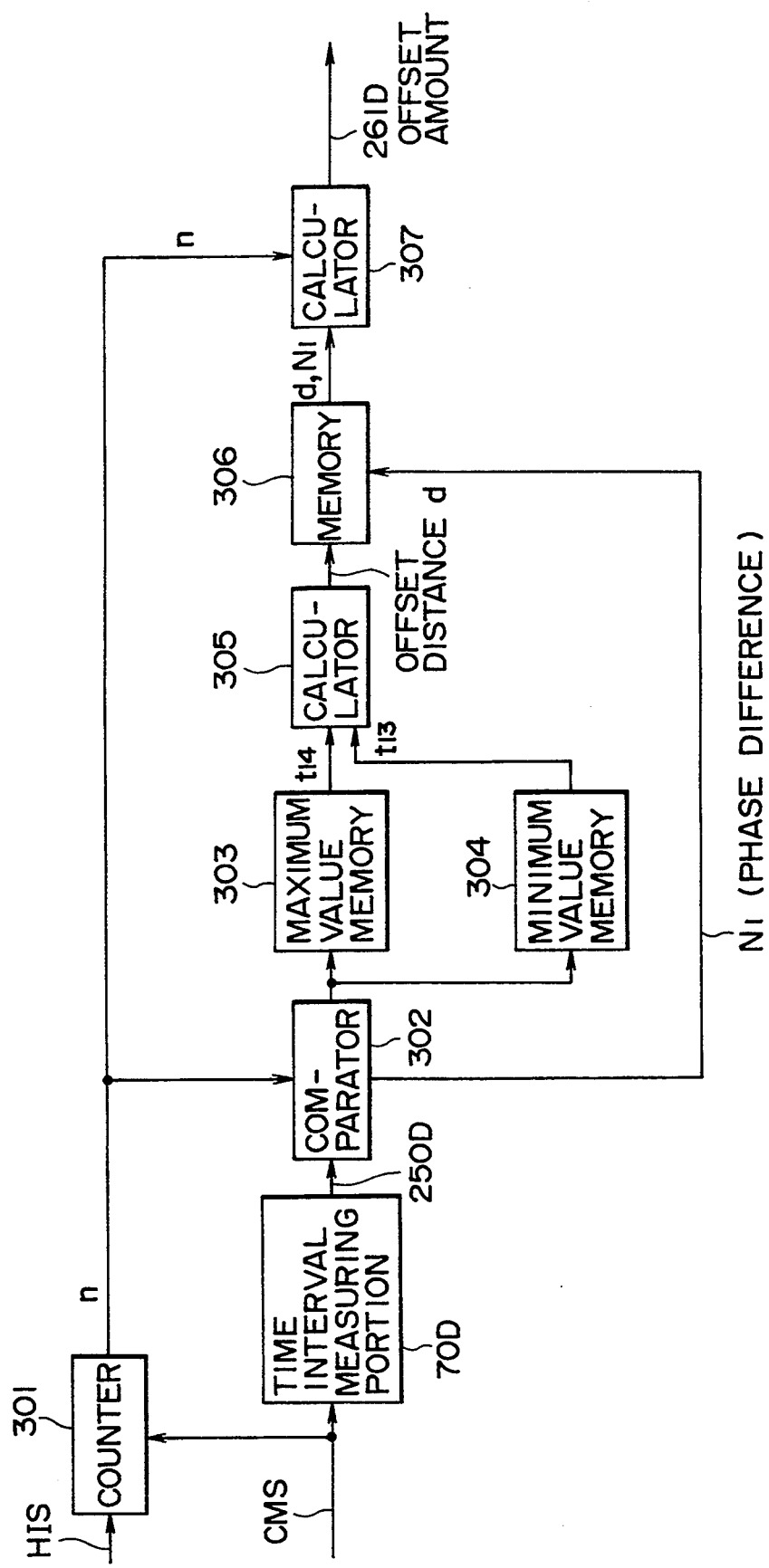
FIG. 21 is a block diagram showing the structure of a fifth embodiment of the offset amount measuring apparatus of the invention.

FIG. 21 shows the structure of the offset amount measuring apparatus for measuring the offset amount along the time axis of a fifth embodiment of the present invention. A time interval measuring portion 70D measures the time interval between the clock mark reproduced signals CMS reproduced from the disk and outputs the time interval measured values 250D. A counter 301 counts the number of the clock mark reproduced signals CMS using the home index signal HIS and outputs the count value n.

A comparator 302 extracts the maximum value t14 of the time interval measured values 250D and stores it into a maximum value memory 303, and it also extracts the minimum value t13 and stores it into a minimum value memory 304. Further, the comparator 302 stores the count value N1 at the time when the maximum value t14 was extracted into a memory 306.

A calculator 305 performs calculation according to equation (8) by using the maximum value t14 stored in the maximum value memory 303, the minimum value t13 stored in the minimum value memory 304, the predetermined number N of the lock marks, and the disk rotational angular speed $\omega$, and the traveling radius of the head R and, then, stores the offset distance d as the result of the calculation into the memory 306.

A calculator 307 performs calculation according to equation (4) by using two values, namely, the count value N1 at the time the maximum value t14 was extracted, i.e., the count value indicative of the phase difference from the home index signal, and the offset distance d, as well as the count number n of the clock marks from the home index signal. The results of calculation for one full rotation of the disk can be utilized as offset correcting values in relation to the disk angular positions.

While the above described embodiments have been those for the magnetic disk, the present invention is not limited to the magnetic disk but is applicable to other disk type record media such as optical disks and magneto-optic disks.

According to an offset amount measuring apparatus of the present invention, the time interval between clock mark reproduced signals output from the head is measured while the head is positioned at a distance of a predetermined radius from the center of rotation of the disk, the distance between the locus of the head traced on the rotating disk and the circular data track is obtained from the measured time interval of the clock mark reproduced signals, and the obtained distance is stored as the offset amount in relation to the angle of rotation of the disk. Therefore, the offset amount produced when a disk is chucked on the revolving shaft of the spindle motor can be measured along the time axis electronically and precisely without using any mechanical precision measuring instrument. By applying the above offset amount to the PLL as a feed-forward amount, a precise clock can be generated.

Further, according to an offset amount measuring apparatus of the invention, the time interval between the clock mark reproduced signals, which correspond to the clock mark signals recorded on the disk adjoining one another, is averaged in a predetermined number of them, within a half rotation of the disk, and such averaged values are output, and differences between the output average values in different angular ranges of the disk are obtained. Accordingly, it has been made to reduce noise included in the offset amount.

Further, according to an offset amount measuring apparatus of the invention, measurement of the time interval between a clock mark reproduced signal at a predetermined angular position of the disk to the mth clock mark reproduced signal is performed for each integer of m=1 to (N+N/2) and the measured time intervals are stored, subtraction of the (P+N/2)th time interval measured value stored from the pth time interval measured value stored is performed for each integer of p=1 to N, the results of the subtraction are stored, the average value of the stored N results of the subtraction is obtained, subtraction of the average value from the kth result of the subtraction stored is performed for each integer of k=1 to N, and the results of the subtraction are stored as the offset amount. Accordingly, the noise included in the offset amount can be reduced.

According to an offset amount measuring apparatus of the invention, measurement of the time interval between the (n+m)th clock mark reproduced signal to the (n+m+N/2)th clock mark reproduced signal is performed for each integer of m=0 to (N−1), the measured time interval is stored, the average value of the stored N time intervals is obtained, subtraction of the average value from the pth time interval measured value stored is performed for each integer of p=1 to N, and the obtained results of subtraction are stored as the offset amount. Accordingly, the number of the counters used for the time interval measurement can be reduced.

According to an offset amount measuring apparatus of the invention, measurement of the time interval between the (n+m)th clock mark reproduced signal and the (n+m+1)th clock mark reproduced signal is performed for each integer of m=0 to (N+N/2−1), the measured time intervals are stored, addition of the N/2 values from the pth time interval measured value to the (P+N/2)th time interval measured value is performed for each integer of p=1 to N, the obtained results of addition are stored, the average value of the stored N results of addition is obtained, subtraction of the average value from the kth result of addition is performed for each integer of k=1 to N, and the obtained results of subtraction are stored. Accordingly, noise included in the offset amount can be reduced and also the number of counters used for the time interval measurement can be reduced.

According to an offset amount measuring apparatus of the invention, the time interval between adjoining clock mark reproduced signals output from the head is measured while the head is positioned at a distance of a predetermined radius from the center of rotation of the disk, the distance between the center of the circular data track and the center of the rotation of the disk is obtained from the measured time interval between the clock mark reproduced signals, the phase difference between the position where the measured time interval takes on a maximum value and the position where the home index signal is recorded is derived, and the offset amount of the disk with respect to the angular position of the disk is calculated from the above derived phase difference, the offset amount produced at the time when the disk is chucked on the revolving shaft of the spindle motor can be measured electronically, not using a mechanical precision measuring instrument.

What is claimed is:

1. An offset amount measuring apparatus for measuring an offset amount having a dimension of time resulting from an offset produced when a disk having a plurality of circular tracks is mounted on a disk apparatus by chucking, said disk being provided with N (where N is an integer larger than 1) clock mark signals recorded around each of said plurality of circular data tracks and spaced apart at physically regular intervals, and said disk apparatus reading said clock mark signals from said circular data track with a head, the measuring apparatus comprising:

time interval measurement means for measuring the time interval resulting from said physically regular intervals between clock mark signals read from said data tracks by said head while said head is positioned at a predetermined radial distance from the center of rotation of said disk;

offset amount calculation means for obtaining a distance between a locus of said head traced on said disk when said disk is rotated and said circular data track by using the time interval between the reproduced clock mark signals measured by said time interval measurement means; and offset amount storage means for storing the distance obtained by said offset amount calculation means as the offset amount in relation to a respective angle of rotation of said disk.

2. An offset amount measuring apparatus according to claim 1, wherein said time interval measuring means measures the time interval between said reproduced clock mark signals for at least one complete rotation of said disk.

3. An offset amount measuring apparatus according to claim 2, wherein said time interval measuring means measures a first time interval between said reproduced clock mark signals when the locus of said head is closest to the center of said circular data track and a second time interval between said reproduced clock mark signals when the locus of the said head is farthest away from the center of said circular data track.

4. An offset amount measuring apparatus according to claim 3, wherein said time interval measurement means performs measurement of the time interval between the (n+m)th reproduced clock mark signal (where n is any integer of 1 to N) and the (n+m+1)th reproduced clock mark signal for each integer of m=0 to (N+N/2−1), said offset amount calculation means includes time interval storage means for storing said measured time intervals and subtraction means for performing subtraction of the (P+N/2)th measured time interval from the pth measured time interval stored in said time interval storage means for each integer of p=1 to N, wherein said offset amount storage means stores the results of subtraction performed by said subtraction means.

5. An offset amount measuring apparatus according to claim 3, wherein either one of said time interval measurement means and said offset amount calculation means includes moving average means for averaging the time interval between successive clock mark signals recorded on said disk in a predetermined number of time intervals within a half rotation of said disk and outputting pertinent average values, and said offset amount calculation means includes subtraction means for obtaining a difference between average values in different angular ranges of said disk output from said moving average means.

6. An offset amount measuring apparatus according to claim 3, wherein said time interval measurement means performs measurement of the time interval between the reproduced clock mark signal at a predetermined angular position of said disk and the mth reproduced clock mark signal for each integer of m=1 to (N+N/2), said offset amount calculation means includes time interval storage means for storing said measured time intervals, first subtraction means for performing subtraction of the (P+N/2)th measured time interval from the pth measured time interval stored in said time interval storage means for each integer of p=1 to N, subtraction result storage means for storing a subtraction result in said first subtraction means, average means for obtaining an average value of the N results of subtraction stored in said subtraction result storage means, and second subtraction means for performing subtraction of the average value obtained by said average means from the kth subtraction result stored in said subtraction result storage means for each integer of k=1 to N, and wherein said offset amount storage means stores the results of subtraction performed by said second subtraction means.

7. An offset amount measuring apparatus according to claim 3, wherein said time interval measurement means performs measurement of the time interval between the (n+m)th reproduced clock mark signal (where n is any integer of 1 to N) and the (n+m+N/2)th reproduced clock mark signal for each integer of m=0 to (N−1), said offset amount calculation means includes time interval storage means for storing said measured time intervals, average means for obtaining an average value of the N time intervals in said time interval storage means, and subtraction means for performing subtraction of the average value obtained by said average means from the pth time interval value stored in said time interval storage means for each integer of p=1 to N, and wherein said offset amount storage means stores the results of subtraction obtained by said subtraction means.

8. An offset amount measuring apparatus according to claim 3, wherein said time interval measurement means performs measurement of the time interval between the (n+m)th reproduced clock mark signal (where n is any integer of 1 to N) and the (n+m+1)th reproduced clock mark signal for each integer of m=0 to (N+N/2−1), said offset amount of calculation means includes time interval storage means for storing said measured time intervals, addition means for performing addition of N/2 values from the pth measured time interval to the (P+N/2)th measured time interval stored in said time interval storage means for each integer of p=1 to N, addition results storage means for storing addition results obtained by said addition means, average means for obtaining an average value of the N results of addition stored in said addition results storage means, and subtraction means for performing subtraction of the average value obtained by said average means from the kth result of addition stored in said addition results storage means for each integer of k=1 to N, and wherein said offset amount storage means stores results of subtraction performed by said subtraction means.

9. An offset amount measuring apparatus measuring an offset amount having a dimension of time resulting from an offset produced when a disk having a plurality of circular data tracks is mounted on a disk apparatus by chucking, said disk being provided with a home index signal recorded in a predetermined position in each of said plurality of circular data tracks indicating a home position of said circular data track and N (where N is an integer larger than 1) clock mark signals recorded around each of said plurality of circular data tracks at physically regular intervals, and said disk apparatus reading said home index signal and said clock mark signals from each of said plurality of circular data tracks with a head, comprising:

time interval measurement means for measuring the time intervals resulting from said physically regular intervals between adjoining clock mark signals read from said data tracks by said head while said head is positioned at a predetermined radial distance from the center of rotation of said disk;

first calculation means for obtaining a distance between the center of said circular data track and the center of rotation of said disk from the time intervals between the reproduced clock mark signals measured by said time interval measurement means;

phase difference derivation means for deriving a phase difference between a position of said disk where the time interval measured by said time interval measurement means takes on a maximum value and a position where said home index signal is recorded; and second calculation means for calculating an offset amount of said disk in relation to a respective angular position of said disk from the distance obtained from said first calculation means and the phase difference derived by said phase difference derivation means.

* * * * *